STORAGE DEVICE FOR A FLEXIBLE RIBBON

Filed Jan. 21, 1966

INVENTOR.

DONALD S. IRONSIDE

Francis J. Thomas

ATTORNEY 3,410,471
STORAGE DEVICE FOR A FLEXIBLE RIBBON
Donald S. Ironside, King of Prussia, Pa., assignor, by mesne assignments, to DASA Corporation, Andover, Mass., a corporation of Massachusetts
Filed Jan. 21, 1966, Ser. No. 522,261
5 Claims. (Cl. 226—200)

ABSTRACT OF THE DISCLOSURE

This invention specifically relates to a storage device wherein a predetermined length of a flexible ribbon, or tape, may be stored without using either a feed roll or a take-up roll. The storage device, herein contemplated comprises a volume (or area) sufficient to store a predetermined length of flexible ribbon, such volume (or area) being divided into two parts by a flexible separator so that the amount of the flexible ribbon stored in each of the two parts may be varied without changing, to any significant degree, the packing density of the flexible ribbon in either of the two parts.

This invention relates to a storage device for flexible media and, in particular, to a device for efficiently storing a tape in a configuration of loops in a relatively small storage area.

A storage apparatus using flexible tape is shown and described in a U.S. patent application, Ser. No. 383,739, filed on July 20, 1964, by James E. Palmer and David L. Nettleton, and entitled, "Tape Transport." In this apparatus a magnetic tape is stored on an edge in a configuration of loops within a tape storage area. The storage area contains a storage loop and a reserve loop, each of which is stored in the configuration of loops or folds.

In the present invention, a device of the type described in the reference patent application is modified by the addition of a flexible separator ribbon which divides the storage area into two regions, one for the storage loop and one for the reserve loop where the relative sizes of the region are variable and adapt to the storage requirements. The primary advantage of separating the storage area with the separator is the reduction of drag that would otherwise be caused by static charges on the adjacent tape in the storage and reserve loops. The separator also prevents interaction between the tape in the storage loop and the tape in the reserve loop.

The preferred embodiment of the invention is described in conjunction with magnetic tape but, the invention is also suitable for use with other flexible media, such as paper tape and film, regardless of the function performed by the media. Furthermore, while the preferred embodiment shows tape stored on edge in a horizontally-oriented storage area, the invention is equally suited for use with a vertically-oriented storage system.

It is thus an object of the present invention to provide an improved storage device for flexible media.

Another object is to provide an improved tape storage device where the storage area is separated into regions by a flexible ribbon.

The foregoing and other objects, features and advantages of the invention will be apparent from the following more particular description of a preferred embodiment of the invention, as illustrated in the accompanying drawings.

Figure 1:
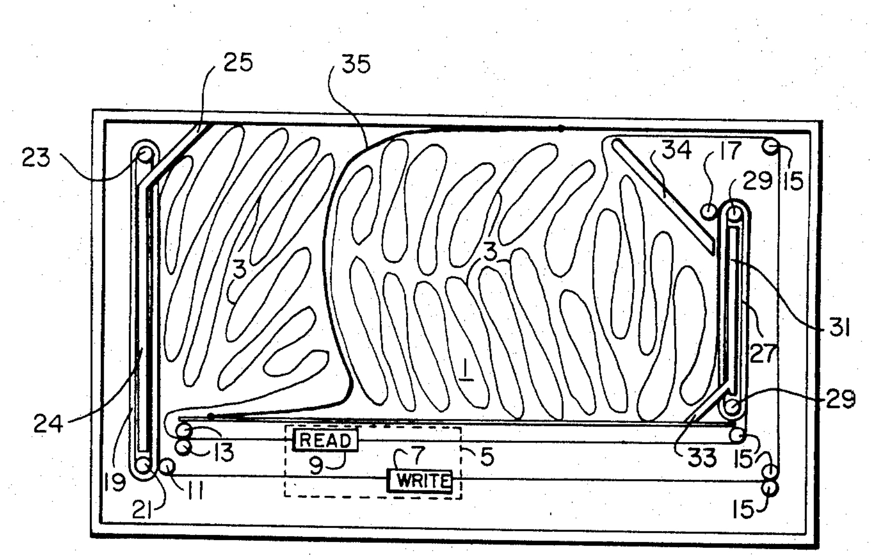
FIG. 1 is a functional diagram of the preferred embodiment of the invention.

As shown in FIG. 1, a storage area 1 contains loops of tape 3. While only a few loops of tape are shown in the storage area in order to simplify the drawings, in practice many loops are densely packed in the area. In the preferred embodiment of the invention, a continuous magnetic tape is employed and two separate portions of the tape are simultaneously stored in opposite ends of the storage area. A data accessing station 5 contains a "write" element 7 for entering data on the tape and a "read" element 9 for sensing previously-written data. These elements 7, 9 contain magnetic transducers and associated components, and can be of the type described in the reference patent application.

Magnetic tape that has left the write element 7 passes a roller 11 to form a storage loop within the left side of the storage area 1. The tape is subsequently removed from the storage loop through capstans 13 to the read element 9 to permit the written data to be sensed at the desired time. The remainder of the tape 3 is stored in a reserve loop in the right side of the storage area through the action of several capstans and rollers 15, 17.

A rubber belt 19 is located at the entrance to the storage loop. This belt continuously rotates in a counter-clockwise direction around two pulleys 21, 23. Tape that has passed the write element 7 is brought into frictional contact with belt 19 by roller 11. The tape loops that have previously been formed in the storage area maintain the entering tape against the belt, especially when a large number of loops are stored. In this manner, the entering tape is urged by the belt toward the rear of the storage area, forming relatively long loops. The entering tape also acts as a wedge, forcing the stored tape loops away from the belt. The belt 19 is narrower than the tape 3 so that the belt contacts the tape in a region which does not contain stored data to prevent wear on the data-storage region. A backing plate 24 supports that portion of the tape that is out of contact with the belt. A deflector 25 urges the tape away from the belt in the vincinity of pulley 23 to prevent the tape from being attracted around this pulley. The backing plate 24 and deflector 25 are described in greater detail with respect to FIG. 2.

In a similar manner, the reserve tape that has passed the read element 9 is formed in long loops by a belt 27 that rotates around two pulleys 29. A backing plate 31 and a deflector 33 serve the same function as the previously-described plate 24 and deflector 25. Tape entering the reserve loop is brought around the belt mechanism and enters the storage area from the rear so that the belt urges the entering tape into loops away from the tape which is to leave the reserve loop. The simpler feed mechanism that is used for the storage (left) loop is not used for the reserve (right) loop to avoid a crossover of the tape entering and leaving the reserve loop. An additional reflector 34 prevents the stored loops from entering the feed mechanism under the attraction of the existing tape.

A flexible ribbon 35 has its ends affixed to walls of the storage area. The ribbon separates the storage (left) loop from the reserve (right) loop. The primary purpose of the ribbon is to reduce the drag caused by static charges on the tape. This is accomplished by using a ribbon with low static attraction properties and a low coefficient of friction with the tape. Suitable ribbon materials are woven nylon or rayon. Since the ribbon separates the storage loop from the reserve loop, each loop is prevented from entering the feed mechanism associated with the other loop. Since the ribbon flexes to conform with tape pressure, the total capacity of the storage area is not substantially reduced.

Figure 2:
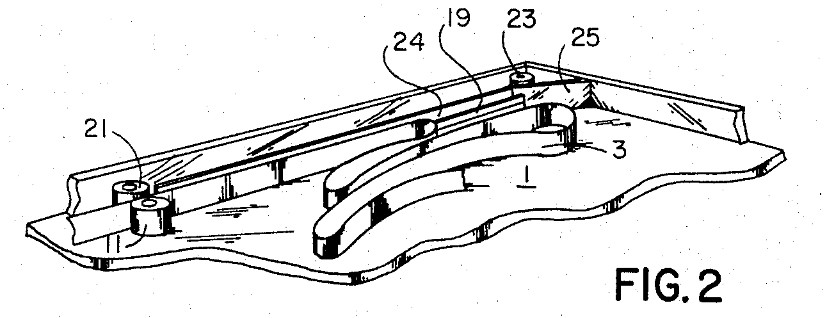
FIG. 2 is a perspective view of a tape transport portion of the preferred embodiment of the invention.

The loop forming apparatus is shown in greater detail in FIG. 2. The belt 19 is driven by pulleys 21 and 23 as described above. The pulleys contain a crown (not shown) at their lower portions to maintain the belt near the floor of the storage area 1. The back plate 24 and the deflector 25 are shown to be of unitary construction with an opening in the deflector portion for the belt 19.

The tape feed components (capstans, drive motors, pulleys, etc.) are not shown in detail because numerous suitable components are well known. Referring to FIG. 1, the belts 19 and 27 are continuously driven by motive means (not shown) connected to either associated pulley. Roller 11 is slidably arranged to bring the tape into frictional contact with belt 19 and pulley 21 to cause the tape to move past the write element 7 during a write operation. Similarly, roller 17 is arranged to bring the tape into contact with belt 27 and pulley 29 to cause the tape to move past the read element 9 during a read operation. Obviously more sophisticated tape feed mechanisms can be employed if desired.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A storage device for flexible tape comprising, in combination:

a storage area adapted to store two loops of tape in varying sizes; and a flexible woven nylon ribbon separator loosely arranged to divide the storage area into two regions of sizes which adapt to the relative sizes of the two loops of stored tape.

2. A storage device for flexible tape comprising, in combination:

a storage area adapted to store two loops of tape of varying sizes; and a flexible woven rayon ribbon separator loosely arranged to divide the storage area into two regions of sizes which adapt to the relative sizes of the two loops of stored tape.

3. In an endless loop magnetic tape transport wherein a magnetic tape is stored on edge in a configuration of loops, tape storage means comprising:

a tape storage area adapted to store said tape in a first region and a second region adjacent said first region, said regions each being of variable size to accommodate varying quantities of tape; and a flexible ribbon separator disposed in a plane parallel to the plane of said tape and loosely arranged to flex in a direction orthogonal to the plane of said tape, thereby to divide said storage area into said first and second regions, said flexible ribbon being operative to reduce drag caused by static charges on said tape and to prevent interaction between tape in said first region and tape in said second region.

4. The invention according to claim 3 wherein said flexible ribbon separator is of a material having low static attraction properties and a low coefficient of friction with said tape.

5. The invention according to claim 3 wherein said flexible ribbon separator has each of its opposite ends affixed to walls of said storage area.

References Cited

UNITED STATES PATENTS

| | | | |
|---|---|---|---|
| 2,335,016 | 11/43 | Lorenyen et al. | 220—22 |
| 2,889,491 | 6/59 | MacDonald | 226—118 X |
| 2,991,920 | 7/61 | Emslie et al. | 226—118 |
| 3,122,333 | 2/64 | Steele et al. | 226—118 X |

ALLEN N. KNOWLES, *Primary Examiner.*